Dec. 15, 1959     R. LEVI     2,917,415
METHOD OF MAKING THERMIONIC DISPENSER CATHODE AND
CATHODE MADE BY SAID METHOD
Filed July 24, 1956
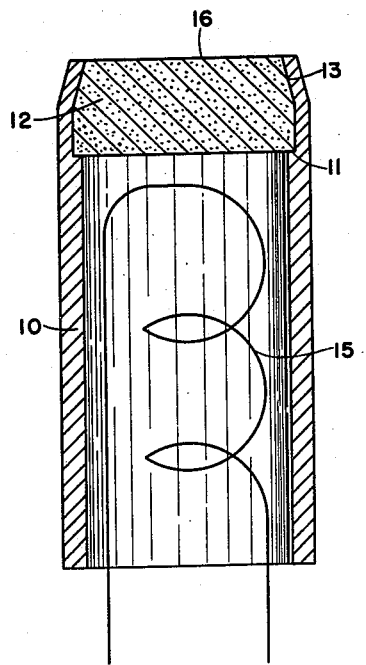
INVENTOR.
ROBERTO LEVI
BY
AGENT

2,917,415

METHOD OF MAKING THERMIONIC DISPENSER CATHODE AND CATHODE MADE BY SAID METHOD

Roberto Levi, New York, N.Y., assignor to North American Philips Co., Inc., New York, N.Y., a corporation of Delaware Application July 24, 1956, Serial No. 599,748

4 Claims. (Cl. 117—223)

This invention relates to a method for making a thermionic dispenser cathode, and to a cathode made by such method.

United States Patent No. 2,700,000 describes a thermionic dispenser cathode comprising a refractory metal, porous body impregnated with an alkaline earth composition capable of reacting, under heat, with the refractory metal in a manner productive of free alkaline earth metal. In a preferred embodiment, the porous body is constituted of tungsten, and the impregnant is barium aluminate. Other suitable impregnants are taught in United States Patent No. 2,700,118, and in my copending application, Serial No. 487,042, filed February 9, 1955.

In operation, the cathode is raised to an elevated temperature in the range of about 850° to 1400° C., in which temperature range a reaction occurs between the impregnant and the refractory metal which produces free barium metal vapor. The evolution of barium vapor enables a thin monatomic layer of the latter to form on the emitting surface, usually an exposed surface, of the refractory metal body, thereby materially reducing the work function of the said surface and enabling copius work to be withdrawn from that surface by the application of an electric field. Only certain compositions of impregnants, among which are those suggested by the aforesaid patents and application, have been found to work.

Attempts to increase the emission from or otherwise improve cathodes of this type have led to a search for other impregnants than those suggested in the aforementioned patents and copending application. It was thus thought that barium oxide (BaO) as an impregnant would provide an improved cathode. The problem then arose as how to get barium oxide into the pores of the refractory metal matrix in a manner such that a satisfactory cathode would ensue.

There is certain prior art which allegedly describes the formation of a barium oxide-impregnated-tungsten body by various techniques. These include, first, the impregnation of the porous body with a barium compound in solution, suspension or molten form, and then conversion by suitable heat treatment of this compound while in the pores of the tungsten body into barium oxide. The barium compound constituting the starting ingredient is not the oxide itself, because the latter is unstable when exposed to the atmosphere and rapidly converts to the corresponding hydroxide and carbonate. Hence, the barium compound is not obtainable in the oxide form, compelling the use of a more stable compound of barium as the starting ingredient, such as the carbonate or nitrate. All attempts to manufacture a cathode by these techniques have been completely unsuccessful. Careful investigation of these results has led to the understanding that the failure of these cathodes to produce electrons is chiefly due to the fact that there is no free barium oxide (BaO) in the pores of the completed cathode. In other words, the heat treatment intended to convert the barium compound in the pores to the oxide form actually established a set of reaction conditions most favorable for a reaction producing as an end product not free BaO but some other material incapable of improving the emission of the refractory metal body. Thus, notwithstanding the statements in the prior art to the contrary, the alleged barium - oxide - impregnated - tungsten - body failed to emit precisely because it lacked free barium oxide in its pores.

The chief object of the invention is a method for producing a thermionic dispenser cathode of the type employing a refractory metal, porous body which is impregnated with an alkaline earth metal composition serving as an emission-enhancing material, and which is characterized by the alkaline earth metal composition consisting entirely of barium oxide, or a mixture of barium oxide with other alkaline earth metal oxides.

The invention is based upon the discovery that to fill the pores of the refractory metal matrix only with alkaline earth metal oxide and prevent promotion of reactions leading to undesired materials can only be accomplished by a process involving two critical and essential steps. The first essential step is to produce the alkaline earth metal oxides outside of the porous body, and then melt the oxides substantially only in that chemical form into, and thus impregnate, the pores of the refractory metal matrix. The second essential step is that the melting in of the oxides must take place in the presence of a non-oxidizing atmosphere at a pressure of at least one-half an atmosphere. Cathodes produced in accordance with the invention have been found to possess emissions in many cases at least 50% higher than the best cathodes made in accordance with the teachings of the aforementioned patents and application. Moreover, they possess a property which makes them especially suitable for certain types of discharge devices wherein it is difficult to maintain a sufficiently good vacuum. It will thus be appreciated that, for certain applications, the cathode of the invention is decidedly superior to the known cathodes and further widens the area of application of this type of electron emitter. A further advantage is that no special steps need be taken during the melting-in operation in connection with maintaining the atmosphere free of contaminants. As a matter of fact, by following the teachings of the invention, it is a surprisingly simple matter indeed to make highly satisfactory cathodes employing alkaline earth metal oxides alone in the pores of the refractory metal matrix.

The invention will now be described with reference to the accompanying drawing, in which the sole figure is a cross-sectional view of one form of dispenser cathode of the invention.

As shown in the drawing, the dispenser cathode of the invention comprises a refractory metal, cylindrical support 10, for example, of molybdenum, having a recess 11 at one end. In that recess 11 is seated a refractory metal, porous body 12 whose pores are filled with alkaline earth metal oxides only. The upper end of the body 12 is slightly tapered at 13, and over that taper is peened the end of the support 10, thus locking the refractory metal body 12 in position. Mounted within the support 10 is a heater 15 for raising the temperature of the refractory metal body 12 to the required value. When at the proper temperature, the top surface 16, which constitutes the emitting surface, of the refractory metal body 12 is capable of supplying copious electrons.

The preparation of the refractory metal body will now be described. The body 12 must be of refractory metal, and must contain a relatively-active reducing agent for the alkaline earth metal oxides. It is preferably constituted of tungsten alone, or of an alloy of tungsten and molybdenum, which is less active than the tungsten alone. The latter provides a very convenient means for controlling the rate of the reaction evolving the free barium vapor. Specifically, the rate at which the barium evolves depends upon the reaction between the refractory metal of the matrix and the alkaline earth metal oxide in the pores. Thus, for the greatest rate of barium evolution, the refractory metal matrix 12 is preferably constituted completely of the more active reducing agent tungsten. To diminish the rate of barium evolution, increasing amounts of the relatively inert molybdenum may be added to the body 12 in the form of an alloy with the tungsten. In some instances, tantalum may also be used. Its activity as a reducing agent for the oxides is even greater than that of tungsten; hence, it is preferably employed in combination with another, less-active, refractory metal.

Another factor of importance is the density of the porous body 12. The latter is preferably made to have throughout its volume a uniform porosity and a density in the range between about 55 and 90% of its theoretical density, that is, if the body were solid metal and contained no pores. This is obtained by means of well-known powder metallurgical techniques involving control of the particle size and distribution of the tungsten powder or tungsten-molybdenum-alloy powder as the case may be, and by employing the correct compacting pressure, sintering temperature and sintering time in forming the initial body. United States Patent No. 2,669,008 describes in detail the manufacture of a porous, tungsten body having a density of 83%. Such a body is highly suitable for use in the cathode of this invention. If necessary, the porous body can also be machined into any desired shape as taught in said Patent No. 2,669,008. As will be realized from said patent, the resultant, refractory-metal, porous body is a very strong, metal member, since it has been fully sintered at a temperature in the neighborhood of 2400° C. for a time sufficient to provide reasonable grain growth. Such a body is far superior, insofar as strength and ruggedness is concerned, to bodies made of a pressed and sintered mixture of the refractory metal and alkaline earth metal composition powders. Another advantage of a cathode constituted of such a matrix is that much higher operating temperatures are permissible, thereby enabling extremely high emission densities to be obtained without fear of damage to the cathode.

After the porous body has been formed, the next step is to prepare the alkaline earth metal material for the subsequent step of impregnation of the porous body. The alkaline earth metal composition is usually obtained in the form of carbonates, since the oxide is unstable in air, and these carbonates customarily constitute the starting ingredients. For example, one may provide a mixture of barium and strontium carbonates in a given mole ratio, or barium and calcium carbonates, or even obtain direct from the manufacturer a coprecipitated mixture of barium and strontium carbonates in a 1:1 mole ratio. In all cases, it is preferred to start with the carbonates, though other alkaline earth metal compositions which yield the oxide upon subsequent treatment may be used. For instance, one can start with barium peroxide ($BaO_2$) which, like the carbonates, decomposes during heating to form BaO. Similarly, barium hydroxide or barium nitrate, in solid form, can be employed as the starting ingredients.

The carbonate mixture is then subjected to a prefusing step for intimately mixing the constituents and wherein a majority of the powdered carbonates are converted to the oxides. This can be done by simply heating the carbonate mixture in a crucible in air with a torch utilizing a mixture of natural gas and oxygen at a temperature at which the powdered mixture fuses. At the fusion temperature, the carbonates decompose into the corresponding oxides with the evolution of $CO_2$. During cooling, various components of the atmosphere will be absorbed, and thus, though the resultant solid, cooled mass will consist principally of oxides, it may contain in addition small quantities of hydroxides, carbonates and oxycarbonates. However, by prefusing the carbonates in the manner just described, most of the resultant mass of material is in the oxide form.

The solid mass is then pulverized to form a powdery substance again, and the thus-formed powder placed in contact with the previously-formed porous body, the combination placed within a suitable furnace, and then heated in a non-oxidizing atmosphere for the melting-in operation. For best results, it is preferred that the lapse of time between the completion of the pulverizing step and the provision of a protective atmosphere for the oxides be short. This is because the pulverized mass, which is composed primarily of oxides, will tend to convert to the corresponding hydroxides and then to the carbonates as a result of simple but prolonged exposure to the atmosphere. By reducing the time lapse between the two aforementioned steps, this tendency is counteracted so that very little if any conversion occurs. To illustrate the magnitude of time involved, I prefer to carry out the pulverization and transfer steps, if done in air, in less than 5 minutes. However, this is not to be considered as limiting, since it will be appreciated that if the pulverization step were carried out in a dry-box preferably containing an inert atmosphere, and the resultant powdery mass retained in the dry-box until the melting-in operation, then the precautions indicated above need not be followed.

The porous body surrounded by the thus-formed powder are then heated in a non-oxidizing atmosphere to the melting temperature of the alkaline earth metal oxides, which is about 2000° C. At this temperature, the powdery mass liquifies and is drawn into the pores of the refractory metal matrix by capillary action. The time of impregnation is preferably as short as is necessary to fill the quantity of the pores of the matrix desired. I have used impregnation times varying between 10 seconds and 10 minutes without any detrimental effects. It will be realized that at the fusion temperature of the oxides, a reaction occurs between the refractory metal and the molten alkaline earth metal oxides which involves the evolution of the alkaline earth metal vapor and the production of a tungstate as an end product. If this reaction is permitted to be carried out to an excessive degree, the quantity of BaO remaining in the pores will be depleted and the life of the cathode shortened. However, if the impregnation time remains below about 10 minutes, the extent of barium evaporation will not be unduly large and reasonable life for the resultant cathode will ensue. An advantage of longer impregnation within the upper limit indicated above, on the other hand, is lower barium evaporation during operation of the cathode, which probably stems from the tungstate plugging up the pores and thus, in effect, reducing the porosity of the refractory metal body.

As was pointed out earlier, an essential element of the method of the invention is the provision of at least one-half an atmosphere of pressure of a non-oxidizing atmosphere for the refractory metal structure and alkaline earth metal composition during the melting-in operation. This is necessary to prevent direct sublimation of the oxides without liquification, which would occur in the absence of pressure. Of course, unless the oxide materials liquify, no impregnation of the refractory metal body is possible. The pressure provided by the non-oxidizing atmosphere enables the oxide materials to liquify instead of sublimating, and thus enables these oxide materials to enter the pores of the refractory metal matrix. Another important function performed by the pressure provided by the non-oxidizing atmosphere is to reduce the rate at which barium is evaporated during the reaction between the molten oxides and the refractory metal matrix while impregnation takes place. This enables a reasonable length of time of impregnation to be employed without fear of excessive loss of barium oxide.

The composition of the carbonate starting ingredients may vary over a relatively wide range. Satisfactory cathodes have been made with barium carbonate alone, with a mixture of barium and strontium carbonates, with a mixture of barium and calcium carbonates, and with a mixture of barium, strontium and calcium carbonates. For best results, a mixture of barium carbonate with at least one other alkaline earth metal carbonate is preferred with the quantity of barium carbonate in the mixture of alkaline earth metal carbonates lying between a 1:2 and 5:1 ratio, i.e., between 1 mole of the $BaCO_3$ and 2 moles of the other carbonates, and 5 moles of the $BaCO_3$ and 1 mole of the other carbonates. The upper and lower limits of the preferred mixture are not very critical. It will be appreciated that what is important is the composition of the material in the pores of the completed cathode. That material should preferably be constituted by at least 25% of free barium oxide. To attain this end, one may start with a relatively large quantity of barium carbonate and employ a long impregnation time. As pointed out earlier, at the melting point of the oxides, the evaporation of the barium oxide is rather high. Thus, the longer the time of impregnation, the less barium oxide which will remain in the pores. On the other hand, it is equally feasible to start with a small amount of barium carbonate and employ a shorter impregnation time and thus produce the same quantity of barium oxide in the pores. The preferred starting composition is a mixture of two moles of barium carbonate and one mole of calcium carbonate. Cathodes produced as described above with this composition yield emission densities 50% higher than the best prior art cathodes of the impregnated type.

To illustrate the invention with a specific example of the manufacture of a typical cathode, there was provided a mixture of 2 moles of barium carbonate and one mole of calcium carbonate in powder form. The mixture was placed in a crucible and heated with a torch in air until the mixture fused. The heating was continued until evolution of gas ceased, after which it was allowed to cool down to room temperature to form a hard mass. The hardened mass of fused material was then pulverized manually, and ground for a short period of time, for example, 1 minute, with a mortar and pestle. Immediately thereafter, the powder was placed in contact with a tungsten pellet of 83% density having a thickness of 0.040 inch and a diameter of 3 mm., made as described in United States Patent No. 2,669,008, the tungsten pellet and powder then immediately deposited in a furnace, of which the temperature was then raised to 2,000° C. as rapidly as possible. The lapse of time between the pulverization and the placing of the powder in the furnace was less than 5 minutes. A mixture of hydrogen and nitrogen at one atmosphere pressure was passed through the furnace during the impregnation step. The powder and pellet is preferably heated as rapidly as possible to the 2,000° C. melting-in temperature, which took about one minute, in order to avoid melting-in of an intermediate, oxy-carbonate phase and the plugging up of the pores. The pellet was maintained at the 2,000° C. temperature for 30 seconds, and then cooled to room temperature. The excess impregnant which adhered to the surface of the pellet was removed, and the completed, impregnated, refractory metal matrix then mounted as shown in the accompanying drawing and activated by heating at 1250° C. for a few minutes in vacuum. Thereafter, the cathode was operated at 1200° C., at which temperature there was obtained extremely high emission densities and a life of more than 1500 hours.

Suitable non-oxidizing atmospheres for the impregnation step are hydrogen, nitrogen or any of the rare gasses such as helium. Mixtures of hydrogen and nitrogen, such as produced by the catalytic cracking of anhydrous ammonia, are eminently suitable in view of the low cost and dryness of the dissociated gas. It is preferred that one atmosphere of pressure be employed, since this enables the melting-in-operation to be carried out in an ordinary, open-bell-jar type of furnace. Lower pressures are equally suitable, however, though more expensive furnace equipment is required. The latter applies equally to pressures above atmospheric.

There follows below a table giving several examples of different starting compositions, impregnation times, and atmospheres in connection with the manufacture of a cathode in accordance with the invention. In all cases, except where indicated, the life was in excess of 1000 hours, and the other steps of the manufacture not specifically indicated were as described above in the specific example. All the cathodes included in the table produced emission densities at least 20% greater than prior art impregnated cathodes, and in most cases at least 50% higher.

| No. | Starting Composition | Impregnation | | Aging Temp., ° C. |
|---|---|---|---|---|
| | | Time (sec.) | Atmosphere | |
| 1 | $BaCO_3$ | 15 | $H_2+N$ | 950. |
| 2 | $Ba,SrCO_3$ (Coprecipitated mixture). | 15 | $H_2+N$ | 950. |
| 3 | 3 moles $BaCO_3$ / 1 mole $CaCO_3$ | 10 | $H_2+N$ | 950. |
| 4 | 2 moles $BaCO_3$ / 1 mole $CaCO_3$ | 30 | $H_2+N$ | 1,100. |
| 5 | 2 moles $BaCO_3$ / 1 mole $CaCO_3$ | 120 | $H_2+N$ | 1,100. |
| 6 | 2 moles $BaCO_3$ / 1 mole $CaCO_3$ | 300 | $H_2+N$ | 1,100. |
| 7 | 2 moles $BaCO_3$ / 1 mole $CaCO_3$ | 600 | $H_2+N$ | 1,200 (life of 350 hours). |
| 8 | 2 moles $BaCO_3$ / 1 mole $CaCO_3$ / 1 mole $SrCO_3$ | 15 | $H_2+N$ | 1,100. |
| 9 | 1 mole $BaCO_3$ / 1 mole $CaCO_3$ | 15 | He | 1,100 (life of 600 hours). |

As indicated above, the preferred technique is to prefuse the carbonate or carbonate mixture to convert as much as possible thereof into the oxide form before placing in contact with the refractory metal matrix. However, this step is not essential to the invention, and it is possible to eliminate the prefusing step if certain precautions are taken. The essential element is to melt into the pores substantially only oxides of the alkaline earth metals. Thus it is possible to effect the conversion of the carbonates to the oxides while the carbonate powder is in contact with the outside of, but not within the pores of, the refractory metal matrix and then, after the conversion is complete, raise the temperature to the fusing temperature of the oxides thereby to impregnate the matrix with the said molten oxides. To illustrate the foregoing, satisfactory cathodes were manufactured starting with the barium carbonate alone, or with mixtures with strontium and calcium carbonate, by placing the barium carbonate powder in contact with a porous, tungsten body and rapidly heating to 2,000° C. in the presence of hydrogen at one atmosphere pressure. As the temperature rises, the carbonate decomposes and converts to the oxide form. At about 1100° C., a phase is reached known as the oxy-carbonate phase, which has a melting point at this temperature. It is important that this temperature be passed as rapidly as possible to avoid excessive melting-in of the oxy-carbonate material and thus plugging up of the pores and preventing further entry therein of the oxides. By heating rapidly, as the temperature rises above 1100° C. but remains below 2000° C., conversion of the oxy-carbonate phase to the pure oxide occurs, resulting in resolidification of the powder, Since the time during which the liquid oxy-carbonate is produced is very short, say, 2 seconds or less, the extent of impregnation of the matrix remains extremely small. At this point, it is worthwhile pointing out that the prefusing step obviated the necessity to take these precautions to avoid the melting-in of the oxy-carbonate phase. As the temperature continues to rise above 1100° C., the impregnant, now constituted solely of oxides, remains in solid form until the temperature of about 2,000° C. is reached, at which time liquification occurs and capillary action draws the molten oxides into the pores. It is again emphasized that an essential step of the invention is the conversion of the starting constituents, which are usually not the oxides, to the oxides while these constituents remain outside of the pores of the matrix, and then elevation of the temperature to the melting point of the oxides causing the latter to impregnate the matrix.

Cathodes made as described above have produced excellent results. In particular, emission denisities 50% higher than prior art impregnated cathodes at comparable temperatures were obtained. In addition, the poisoning resistance of the cathode was greatly enhanced, enabling such cathodes to be employed in discharge devices wherein poorer vacuums were present. Hence, the invention has made possible many more applications for this dispenser type of cathode.

While I have described my invention in connection with specific embodiments and applications, other modifications thereof will be readily apparent to those skilled in this art without departing from the spirit and scope of the invention as defined in the appended claims.

What is claimed is:

1. In a method of manufacturing a thermionic dispenser cathode containing a porous high-density tungsten-containing refractory-metal body with interconnecting pores and comprising providing an alkaline earth metal composition including a barium composition decomposable to the oxide form, the improvement comprising prefusing said composition outside of the pores of and out of contact with the refractory-metal body to convert same to a material consisting essentially of alkaline earth metal oxides including barium oxide, and heating said porous refractory-metal body in contact with said last-formed material to the melting temperature of said material in a non-oxidizing atmosphere at a pressure greater than half an atmosphere to cause said material to liquify and enter the pores of said body, thereby to produce free alkaline earth metal oxide including barium oxide in the pores of said body.

2. In a method of manufacturing a thermionic dispenser cathode containing a fully-sintered porous tungsten-containing refractory-metal body having a density in the range between 55 and 90% of its theoretical density and interconnecting pores, the improvement comprising providing a mixture of barium carbonate and another alkaline earth metal carbonate in a mole ratio of the former to the latter between 1:2 and 5:1, prefusing said mixture outside of the pores of and out of contact with the refractory-metal body to convert same to a material consisting essentially of alkaline earth metal oxides including barium oxide, and thereafter heating said porous refractory-metal body in contact with said last-formed material at the melting temperature of said material for a short time and in a hydrogen-containing atmosphere at a pressure of one atmosphere to cause said material to liquify and enter the pores of said body, thereby to produce free alkaline earth metal oxide including barium oxide in the pores of said body.

3. A method as set forth in claim 2 wherein the other carbonate is calcium carbonate and the initial mixture contains about 2 moles of barium carbonate for each mole of calcium carbonate.

4. A thermionic dispenser cathode comprising a refractory-metal, tungsten-containing body with interconnecting pores containing free barium oxide and made according to the method of claim 1.

References Cited in the file of this patent

UNITED STATES PATENTS

| | | |
|---|---|---|
| 1,883,840 | Weigand | Oct. 18, 1932 |
| 1,922,244 | Hunter | Aug. 15, 1933 |
| 2,085,605 | Ramsey et al. | June 29, 1937 |
| 2,131,204 | Waldschmidt | Sept. 27, 1938 |
| 2,147,447 | Kolligs | Feb. 14, 1939 |
| 2,173,259 | Lederer | Sept. 19, 1939 |
| 2,175,345 | Gaidies et al. | Oct. 10, 1939 |
| 2,389,060 | Kurtz | Nov. 13, 1945 |
| 2,700,000 | Levi et al. | Jan. 18, 1955 |
| 2,700,118 | Hughes et al. | Jan. 18, 1955 |